UNITED STATES PATENT OFFICE.

OTTO FIORILLO, OF BALTIMORE, MARYLAND.

IMPROVEMENT IN PROCESSES OF MANUFACTURING ANILINE BRONZE.

Specification forming part of Letters Patent No. 171,787, dated January 4, 1876; application filed December 8, 1875.

*To all whom it may concern:*

Be it known that I, OTTO FIORILLO, of Baltimore, in the county of Baltimore and State of Maryland, have invented a new and useful Process of Mixing Aniline Colors with Benzoic Acid, to be used especially in making bronze color or paint; and I do hereby declare that the following is a full, clear, and exact description thereof, which will enable others skilled in the art to which it appertains to make and use the same.

This invention consists, broadly, in the admixture of benzoic acid with aniline colors, for the purpose of producing a bronze paint or color, the shade or tint of which may be varied according to the aniline colors used and the detailed treatment to which they are subjected during the process.

To manufacture my improved gold bronze I proceed as follows: I dissolve ten (10) parts of aniline red, or so-called diamond fuchsine or roseine, and five (5) parts of aniline purple (known in commerce as "Hoffman's violet" or methyl violet) in one hundred (100) parts of alcohol of 95° strength, placing the vessel containing the mixture in a hot-water or sand bath, to promote the dissolution. As soon as the aniline has been dissolved in the alcohol I add five (5) parts benzoic acid, boil gently, then add thirty-two (32) parts of gum benzoin, and continue boiling from five to ten minutes, until the cantharide-green color of the mixture disappears, changing into a bright golden bronze color.

The color thus produced is of a very high luster, of great durability, and will adhere firmly to paper, papier maché, wood, glass, tin, china, leather, and, in fact, to nearly all substances. It is readily applied with a brush, and dries in a few minutes. It will answer its purpose equally well on white and colored grounds; and may be used, on account of its durability and the facility with which it is applied, upon ladies' boots, slippers, shoes, or other articles of leather, to which it imparts a bright golden bronze hue. I have also found that this paint or color adheres firmly to metal of every description, and may be used with advantage upon metallic articles of any kind used for ornamental or useful purposes.

Having thus described my invention, I claim and desire to secure by Letters Patent of the United States—

1. The process of manufacturing bronze paint or color of various shades by mixing benzoic acid with aniline colors, substantially as and for the purpose hereinbefore set forth.

2. The process of manufacturing aniline bronze herein described, consisting in, first, dissolving aniline red and aniline purple in alcohol; secondly, adding benzoic acid; thirdly, boiling the mixture; fourthly, adding gum benzoin; and, fifthly, boiling this mixture until the color changes from green to a golden bronze.

In testimony that I claim the foregoing as my own, I have hereunto affixed my signature in presence of two witnesses.

OTTO FIORILLO.

Witnesses:
 WM. BAGGER,
 JNO. W. MADIGAN.